United States Patent [19]
Fletcher et al.

[11] 3,988,716
[45] Oct. 26, 1976

[54] COMPUTER INTERFACE SYSTEM

[76] Inventors: James C. Fletcher, Administrator of the National Aeronautics and Space Administration, with respect to an invention of; Tage O. Anderson, Arcadia, Calif.

[22] Filed: Aug. 5, 1974

[21] Appl. No.: 495,022

[52] U.S. Cl. .................... 340/172.5; 179/15 BA; 328/111
[51] Int. Cl.² ........................................ G06F 15/16
[58] Field of Search ............... 340/172.5; 328/111, 328/112, 63, 165; 307/234; 179/15 BA

[56] References Cited
UNITED STATES PATENTS

| | | | |
|---|---|---|---|
| 3,214,739 | 10/1965 | Gountanis et al. | 340/172.5 |
| 3,363,234 | 1/1968 | Erickson et al. | 340/172.5 |
| 3,401,380 | 9/1968 | Bell et al. | 340/172.5 |
| 3,603,935 | 9/1971 | Moore | 340/172.5 |
| 3,609,705 | 9/1971 | Mercy | 340/172.5 |
| 3,648,256 | 3/1972 | Paine et al. | 340/172.5 |
| 3,699,529 | 10/1972 | Beyers et al. | 340/172.5 |
| 3,715,729 | 2/1973 | Mercy | 340/172.5 |
| 3,727,142 | 4/1973 | De Sipio et al. | 328/111 |

*Primary Examiner*—Malcolm A. Morrison
*Assistant Examiner*—Errol A. Krass
*Attorney, Agent, or Firm*—Monte F. Mott; Paul F. McCaul; John R. Manning

[57] ABSTRACT

An interface logic circuit permitting the transfer of information between two computers having asynchronous clocks is disclosed. The information transfer involves utilization of control signals (including request, return-response, ready) to generate properly timed data strobe signals. Noise problems are avoided because each control signal, upon receipt, is verified by at least two clock pulses at the receiving computer. If control signals are verified, a data strobe pulse is generated to accomplish a data transfer. Once initiated the data strobe signal is properly completed independently of signal disturbances in the control signal initiating the data strobe signal. Completion of the data strobe signal is announced by automatic turn-off of a return-response control signal.

8 Claims, 5 Drawing Figures

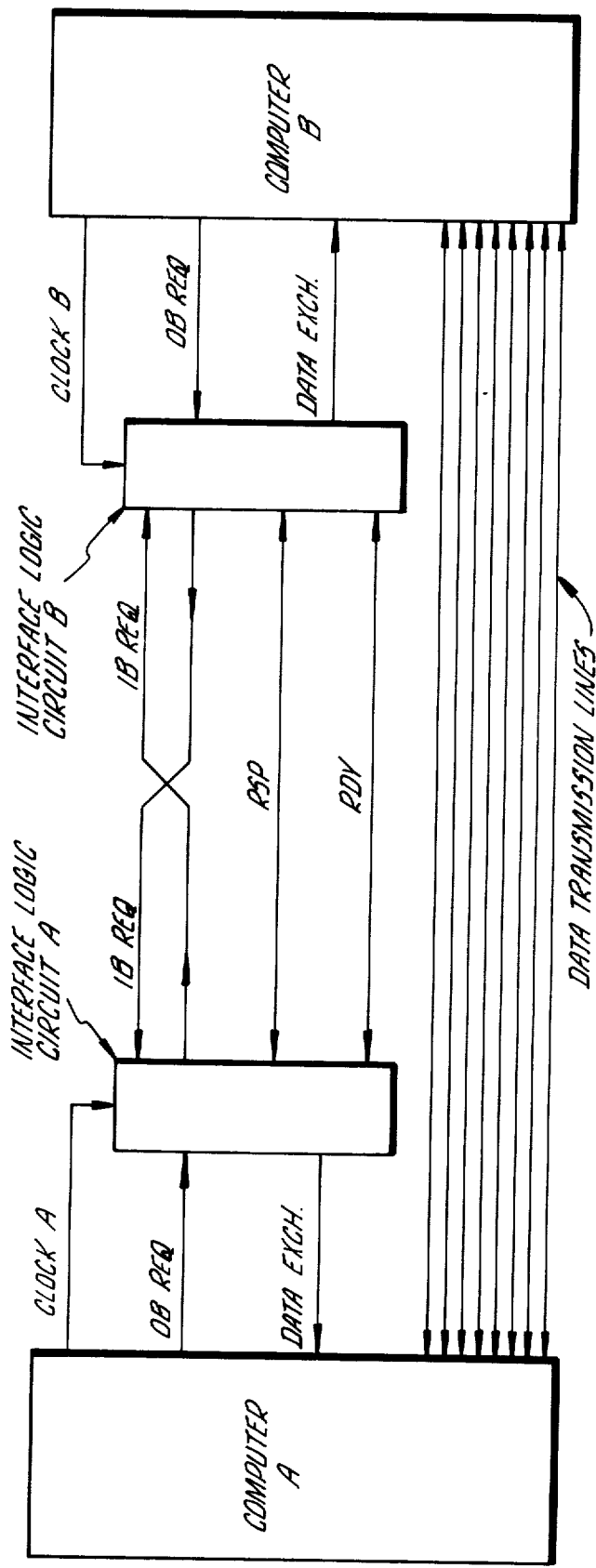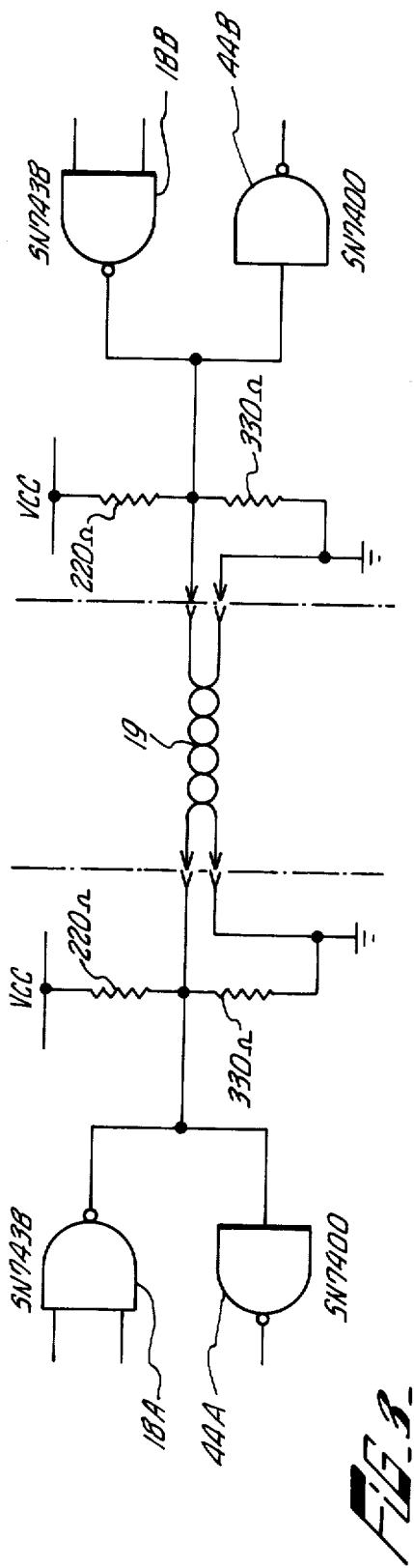

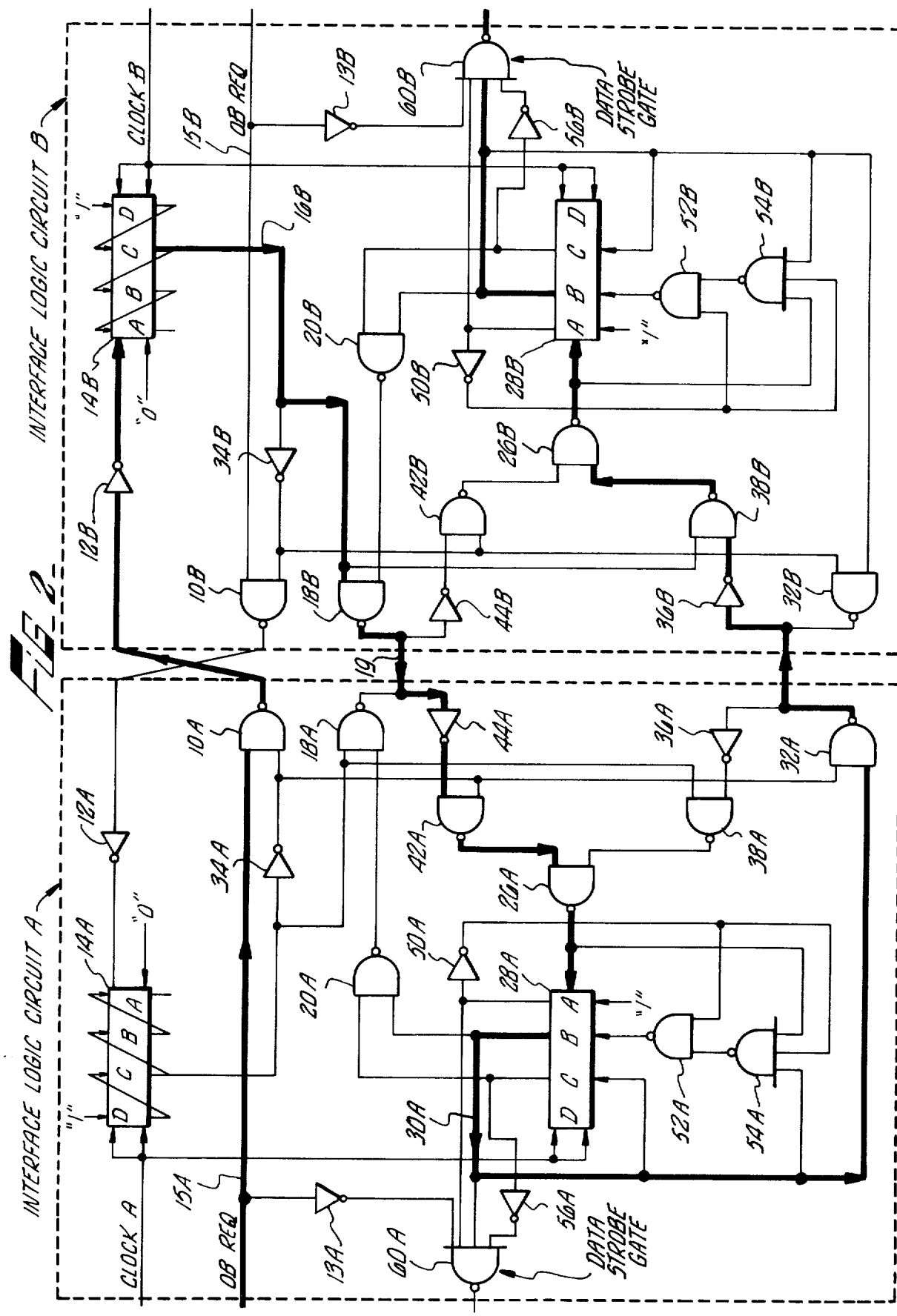

COMPUTER INTERFACE SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435 42U.S.C. 2457).

BACKGROUND OF THE INVENTION

1. Field of the Invention

This invention relates generally to asynchronous transmission of data between two computers having asynchronous clocks. More particularly the present invention relates to an interface logic system which, with a minimum of components and inter-connecting lines, verifies that valid information transfer control signals exist and assures proper completion of a data strobe pulse.

2. Description of the Prior Art

Computers and/or computer related equipment must be synchronized with one another in order to successfully transmit and receive control signals and data. If both computers have a master clock as a common time base, the problem is not critical. If the two computers are asynchronous, i.e., each having their own internal time base, and the data transfer rate is intermittent or asynchronous, synchronization becomes a problem.

An aspect of the asynchronous problem which creates further complications is that false or transient pulses often appear on the lines interconnecting the two computers. Such transients, if mistakenly identified as a control signal, may result in a data transfer sequence to an upsuspecting computer at a totally inopportune time. This aspect of the problem, prior to this invention, has plagued most prior art approaches.

A common prior art approach for transferring signals between two asynchronous computers is to use a special encoding format for the signals to be transmitted. The special format includes synchronizing information which is conbined with any control signals that are to be sent between the computers. Within a receiving computer the synchronizing information is separated from the control signals, and it is employed to correct a locally generated clock so that the local clock is synchronized to the remote computer's clock. In such devices it is common to employ the corrected clock as a shift command for signal buffer shift registers. Incoming signals are clocked into the buffer shift registers, and any time differences between the clocks of both computers are absorbed by the signal buffer registers.

Such prior art solutions are unattractive because signal buffer registers waste significant computer time and represent additional complex equipment. Furthermore, the encoding, decoding and other handling of the additional synchronizing information is undesirable. Shifting the local clock also involves costly and signal-sensitive synchronizing loops and this is undesirable. In summary, such prior art schemes typically exemplify complex interface systems as compared with the features of this invention.

OBJECTS AND SUMMARY OF THE INVENTION

The subject invention is an interface logic system which solves the above-noted interface problems of the prior art by providing a novel interface logic circuit at each computer. The interface logic circuits utilize an interchange of control signals via two unidirectional request lines and two bidirectional report lines. The amount of logic circuitry is less than that normally employed in prior art buffering schemes.

Control signals of a proper sequence are interchanged between the interface circuits. Such signals are verified as valid signals at each receiving computer. Once such verification has been achieved, transfer of data takes place under command of a data strobe pulse which, once initiated, is assured of independent completion. The logic of this invention allows a data strobe pulse to be sent out only in response to a valid series of control signal interchange operations. Noise transients of certain duration of either polarity are ignored because verification of each interchange control signal is required by the logic of the interface control circuit of this invention. The verification is accomplished on the basis that each control signal must be present for at least two clock periods of the computer which receives the control signal before the next control signal of the sequence is generated. Transient signals of either polarity, shorter than two clock pulse times, will not be verified. Thus such noise transients cannot upset transfer of signals between the communicating computers.

It is therefore an object of this invention to provide an interface logic system in which each control signal is verified prior to the transmission of the next upcoming control pulse. Verification is accomplished in accordance with the clock of the computer which receives the control signal to be verified.

It is a further object of this invention to provide a system for eliminating the effects of transient pulses of either polarity in interface circuits between two computers by providing a system for multiple verification.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a block diagram of the subject interface logic system, illustrating two asynchronous computers and associated interface logic circuits;

FIG. 2 is a detailed block diagram of the interface logic circuits of FIG. 1, illustrating the pulse flow in a sequence initiated by Computer A, for data from Computer B;

FIG. 3 is a schematic diagram of the interface line drivers and receivers for the various sections of the interface logic circuits of FIG. 2;

DETAILED DESCRIPTION OF THE PREFERRED EMBODIMENT

Referring to FIG. 1, two computers, Computer A and Computer B, each are shown having an interface logic circuit, logic circuits A and B respectively. The interface circuits allow the computers to communicate with each other so that data may be transferred from one to the other. Each interface logic circuit is provided with clock pulses from its associated computer. An outbound request line (OB REQ) is provided between a omputer and its interface logic circuit. An outbound equest signal is an initial control signal forming part of n entire sequence of control signals that are necessary henever one computer desires to transmit data to the ther computer.

The interface logic circuits are linked together by wo unidirectional inbound request lines (IB REQ) and y two bidirectional report lines — response (RSP) and eady (RDY). The computers are themselves linked ogether by eight bidirectional data transmission lines. These eight lines carry data read out in parallel form ccording to the strobing system which responds to a lata strobe pulse provided by this invention.

Figure 5:
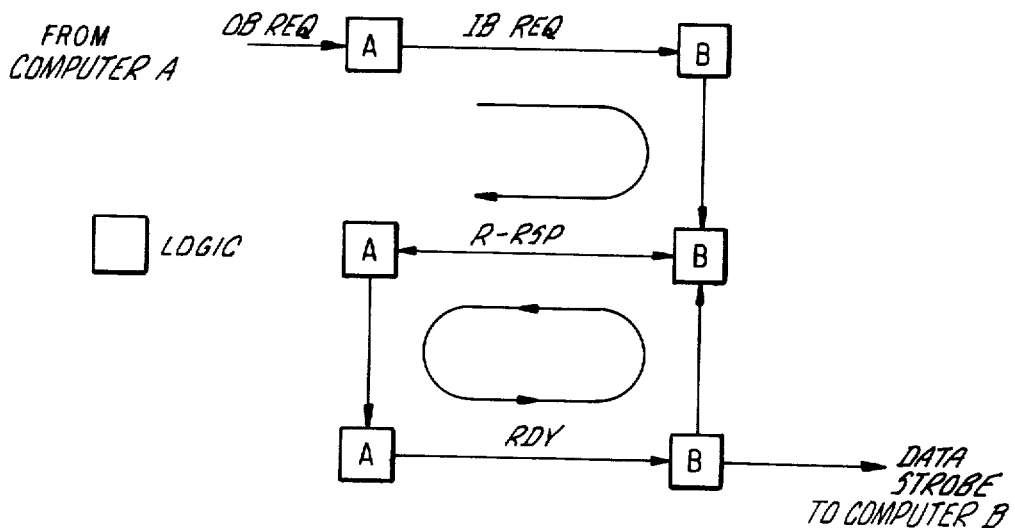
FIG. 5 is a block diagram illustrating the functions performed by the circuits of FIG. 2.

For a brief summary of the operation of the two nterface circuits, reference ia made to FIG. 5. FIG. 5 lepicts a diagrammatic control signal flow chart with ogic circuits shown simply as blocks. Assume that Computer A is the requesting computer desiring to end information and that Computer B is the requested computer which is to receive information.

Computer A presents data for Computer B on the lata exchange lines. That data will be accepted at Computer B when a data strobe pulse is delivered to Computer B by its interface circuit. An outbound request signal (OB REQ) from Computer A is repeated ogically as an inbound request signal (IB REQ) for interface B. Interface B, in reply, generates a response signal (RSP) which is returned to interface A over a bidirectional return-response line, shown in FIG. 1. A ready signal (RDY) is generated within interface A and that signal goes back to interface B from interface A over a bidirectional ready line shown in FIG. 1. A data strobe signal is thereafter emitted by Computer B's interface and data transfer is accomplished. The ready signal plays a dual role in that after the data strobe occurs, the ready signal at interface A is instrumental in causing the return-response signal from interface B to interface A to terminate. Termination of the return-response signal serves as an announcement to interface circuit B that a byte of data has been received.

The invention provides completion of the data strobe signal without dependence of what is happening on the input signal line that initiated the data strobe pulse. After the data strobe pulse has been properly completed, a strobe-complete report is indicated by causing the return-response signal to interface A to be turned off.

The above-described sequence is applicable for a single or multiple data-byte transfer. If multiple bytes are to be transmitted, the input request signal persists for longer time periods. In such an event, the sequence just described repeats itself until the last data character is delivered. At that time, all circuits automatically resume their normal operating condition and interface circuit B is informed that the last character was transmitted because the return-response signal is turned off and remains off.

Figure 4:
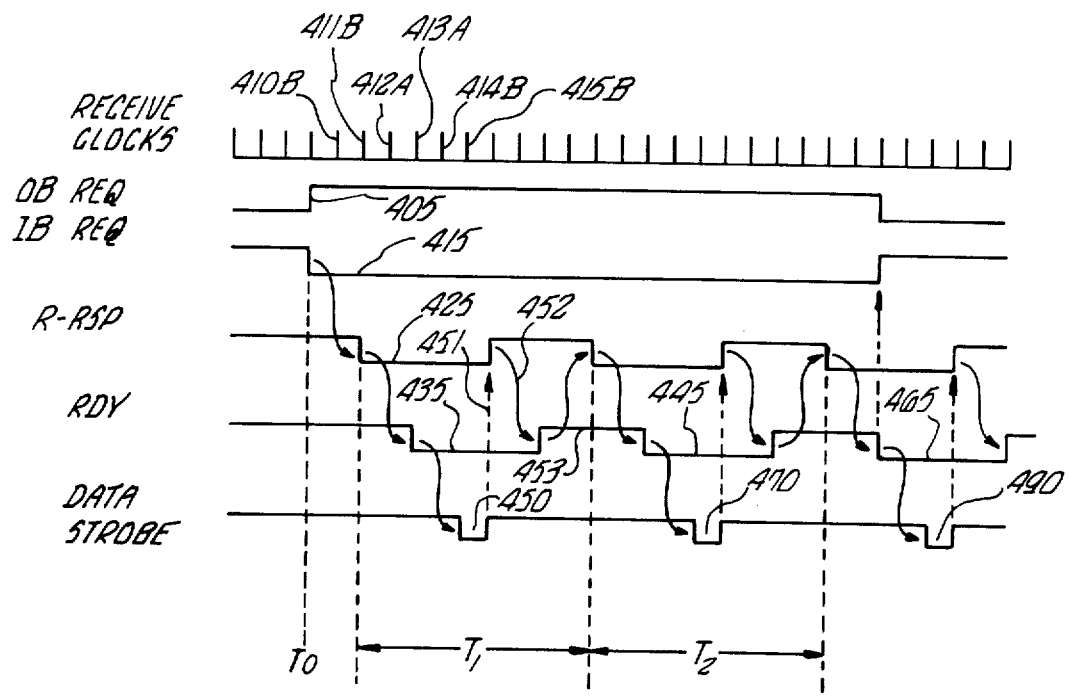
FIG. 4 is a pulse timing diagram illustrating the states of the signals on the "request," "response," "ready," and "data strobe" lines in FIG. 2.

With reference to FIG. 4, a timing chart is depicted for an operation wherein Computer A is the requesting computer and Computer B is the requested computer. Computer A initiates an OB REQ signal 405 in the form of a transition changing from a low to a high level. At time $T_0$, the outbound request signal 405 changes to a high level. This signal 405 is present on the outbound request line OB REQ, FIG. 1, to interface circuit A from Computer A. Assuming that all the logic circuits in the interface circuit A are in an initial condition for a data transfer sequence, interface circuit A repeats the OB REQ signal as an IB REQ signal 415 on the inbound request line going to interface circuit B. Interface circuit B then samples IB REQ 415 against Computer B's clock for two clock pulses 410B and 411B. (It should be noted that the clock signals for Computer A and Computer B are simply labeled "receive" clocks and are assumed in synchronism for simplicity of description. If IB REQ signal 415 is present for at least two clock pulses, based on Computer B's clock, interface circuit B initiates a return-response RSP signal 425. RSP signal 425 is transmitted from Computer B's interface circuit over the response line to interface circuit A.

Interface circuit A then samples RSP signal 425 over two clock pulses 412A and 413A, based on Computer A's clock. If RSP signal 425 is present for at least two clock pulses Computer A initiates RDY signal 435. The RDY signal 435 is transmitted over the ready line to interface circuit B. Interface circuit B then samples RDY signal 435 over two clock pulses 414B and 415B. If the RDY signal 435 is present for at least two clock pulses, a data strobe pulse 450 of one clock duration is generated by Computer B's interface circuit and that pulse 450 is transmitted to Computer B. Upon the arrival of this data strobe pulse 450, Computer B strobes the information transmitted over the data transmission lines, FIG. 1, to Computer A in any well known manner.

If Computer B were the requesting computer, then the sequence would be the same, only in the reverse direction. As will be described, logic elements in the interface circuits permit the two-way transmission of a sequence of control signals over the request, response and ready lines. These logic elements also include a pair of drivers and receivers at each end of these bidirectional lines whose operation automatically routes the signals in the proper direction.

FIG. 3 depicts a suitable bidirectional transmission line (such as a RDY or RSP line) in the form of any well twisted pair of wires. Line drivers 18A and 18B may typically comprise two input NAND gates such as SN 7438 as shown. Receivers 44A and 44B are one input NAND gates such as SN 7400 as shown. These gates and the transmission lines are properly terminated and conditioned by employing ground, a voltage VCC, and a potential divider including resistors having resistance values of approximately 220Ω and 330Ω as is well known in the computer art. The manner in which signals are transmitted over the bidirectional line is described in more detail with reference to FIG. 2.

Referring now to FIG. 2, a detailed description of the interface logic circuits of FIG. 1 is provided. Computers A and B are provided with identical interface logic circuits which function to verify a sequence of control signals between the two computers. The sequence of control signals are interchanged for the purpose of arriving at a verified data strobe pulse. The strobe pulse is transmitted to one of the computers for the purpose of reading data from another computer into the one computer.

Assume that an outbound request signal 405, FIG. 4, has emanated from Computer A as an input signal to NAND gate 10A. The capital letter after the reference numeral indicates the interface logic circuit to which the numbered element belongs. For convenience, the flow of one sequence of control signals is indicated by the heavy lines and arrowheads shown in FIG. 2. NAND gate 10A is conditioned initially by a zero state in stage C of register 14A which low level is inverted by inverter 34A as a high level input to NAND gate 10A. NAND gate 10A receives and repeats the outbound request signal 405 as an inbound request signal that is transmitted to interface circuit B. An inbound request signal such as 415, FIG. 4, includes a transition from a high to a low level. The inbound request signal 415 is inverted twice, once by gate 10A and once by inverter 12B. Signal 415 is applied to a mode shift terminal of a bidirectional 4-bit shift register 14B.

Clock pulses from Computer B are present at the shift and load terminals of shift register 14B as shown in FIG. 2. The direction of shift for signal levels, or states within the stages of register 14B is controlled by the polarity of the signal on the inbound request line. Signal states within register 14B occur at Computer B clock times. A logic level 1 signal is provided at the upper rightmost terminal of shift register 14B and 0 logic level is introduced into the lower leftmost terminal for this shift register. The polarity present on the shift mode input for shift register 14B, in conjunction with clock B pulses and the fixed 0 and 1 input levels, determines the pattern of logic levels, or states, within register 14B.

For example, when the inbound request is at a low level, i.e., the signal from inverter 12B is at a logic 0 level, zeros are shifted to the right within register 14B, with one shift occurring with each clock B pulse. A continued low level thus results in zeros appearing at all register stages within shift register 14B.

When a high level is present at the mode control input for register 14B, the shift register assumes a shift-left mode such that logic level 1's enter from the right due to the fixed 1's input at the upper righthand corner of register 14B. If the request signal maintains its high level for two clock pulses, the fixed 1 level from the upper right hand input terminal is shifted first into stage D and next into stage C of register 14B. With a 1 present in stage C, the input conditions for gates 10B and 18B change.

At gate 10B, the inverter 34B inverts the high level from stage C to a low level thus disabling that gate irrespective of what signal conditions may exist on the OB REQ line 15B. Accordingly, the circuit operation just described establishes an interlock safeguard when an inbound request is received at interface B and thus giving inbound data priority. Inhibiting gate 10B prevents Computer B from attempting to signal interface A that it wants interface A to request data from Computer B.

Concurrently, at gate 18B a high level from register C is present together with a high level from the output of gate 20B. Gate 20B monitors stages B and C of register 28B, which stages are normally in a 0 or low state thus resulting in gate 20B's output normally being high. The output of gate 18B thus goes low and delivers a return-response signal to interface A via the return-response line 19.

Gate 26A is a mode control gate for register 28A at interface A. Registers 28A (and register 28B) serve dual functions in that each is capable of generating a ready signal and a data strobe pulse. In the example under consideration however, register 28A generates a ready signal which follows the darkened signal flow lines to interface B. The manner of generating the ready signal is described hereinafter following a description of operation of registers 28A and 28B.

Registers 28A and 28B are connected for unidirectional shift-right and parallel load depending upon the mode control input signal level from gates 26A, 16B and gates 52A, 54A and 52B, 54B respectively. A fixed logical 1 is present at input stage A. Clock pulses shift signal states within the register stages with one shift for each clock pulse. Each register has four stages A, B, C and D with stage D not being used. The parallel entries into each register 28A or 28B are connected so that the registers will shift-right also in this mode with certain modifications as dictated by gates 52A, 52B and 54A and 54B.

A truth table for numerous input possibilities is presented in Table 1. As shown in Table 1, the following vector argument is derived. When an input signal, S, from gate 26A (or gate 26B) is a high level, or a 1, then a 1 is entered into the shift-right connected entry of register 28A upon appearance of a clock pulse A. What is in register stage B is always entered into register stage C, while the status of register stage B is a function of the polarity of the input signal and the contents of the remaining register stages. When an input signal for the mode control is a 0, the register is connected for shift-right and what is in stage A will always be shifted to stage B. When the mode control input is a 1, what is in stage A is always shifted into stage B with the exception of $S = 1$, $A = 0$, and $B = 1$. In that exception, gates 52A and 54A (or gates 52B and 54B) enter a 1 into stage B rather than entering the 0 from stage A into stage B. The purpose for this exception is described in detail hereinafter in connection with a further description of Truth Table No. 1.

Returning now to FIG. 2, the operation of register 28A in responding to the return-response signal received at interface B is described.

Gates 42A and 38A are each normally conditioned to deliver high or true input signals to gate 26A. Gate 26A, in turn, normally presents a low or 0 state as an input to stage A or register 28A. Register 28A thus has its stages set in 0 states. When a return-response signal as a low level is inverted by inverter 44 to a high or true level, the conditions are satisfied for the output of gate 42A to go low and thus cause the output of gate 26A to assume a high level. The high level on the mode control lead stores a 1 first into stage A at the occurrence of a clock pulse from Computer A's clock. If the return-response signal persists for a second clock pulse, then a 1 is moved into stage B of register 28A. When register B contains a 1, the high level is applied as an input signal to gate 32A as shown by the darkened signal flow line. Both input signals to gate 32A are high at that instant so the output signal of gate 32A goes low. Transition of the output of gate 32A from a high to a low level forms ready pulse 435, FIG. 4.

At this point, it should be noted that the status of register stages for register 28A is as follows: $A = 1$, $B = 1$ and $C = 0$. As shown by underlining in Truth Table No. 1, that condition is proper for a data strobe signal provided that the output signal from inverter 13A is also high. In this instance, however, inverter 13A is inverting the high level of OB REQ signal 405, FIG. 4, and thus no data strobe signal is emitted from gate 60A.

At interface B, ready pulse 435 is gated through to register 28B in exactly the same manner as that just described for the return-response signal 425 at interface A. At interface B, however, inverter 13B presents a high level to gate 60B since OB REQ line 15B is at a low level.

Ready signal 435 is verified as low for two clock periods as earlier described. If it is so verified, then register 28B has its stages in the following states: A = 1, B = 1 and C = 0. This vector generates data strobe pulse 450, FIG. 4. Data strobe pulse 450 is thus emitted from gate 60B. Data strobe pulse 450 is a negative pulse having a duration for one clock period as shown in FIG. 4.

Data strobe pulse 450 is completed upon the next clock pulse when the stages B and C both are set to 1 states. A 1 state in stage C is inverted by inverter 56B and thus that status terminates the data strobe pulse by disabling gate 60B. Concurrently, the 1 state in stages B and C cause the output of gate 20B to go low. Accordingly, the output signal from gate 18B goes low.

Reference to FIG. 4 shows that the completion of data strobe pulse 450 terminates the return-response pulse 425 as shown symbolically by dashed arrow 451. That termination of pulse 425 is dictated by the 1 in stages B and C of register 28A. Because both register 28A and 28B must shift right for two clock pulses, the termination or return-response 425 is followed two clock pulses later by termination of ready signal 435, as shown symbolically by arrow 452. Two clock pulses later, as shown by arrow 453, the return-response 475 is formed because the inbound request signal 415 is still low. The sequence just described defines the data strobe period $T_1$ shown in FIG. 4.

Interface circuit B is adapted to automatically announce to the interface A that the data strobe pulse is completed. That announcement occurs because strobe completion occurs when stage B = 1 and C = 1. These stages satisfy the input conditions to gate 20B and thus its output goes low and gate 18B goes high and terminates the return-response pulse. Reference to FIG. 4 shows by arrow 450 that return-response signal 425 goes high at the completion of data strobe pulse 450. When the return-response line is high, as described earlier, the mode control signal at the output of gate 26A changes to a zero level, and because that level is held for two clock pulses, the 0 moves into stage B and thus disables NAND gate 32A. Disabling of NAND gate 32A changes the level at mofe control gate 26B such that a zero again moves into shift register 28B and that 0 is clocked into register 28B. Two more clock pulses will move the 0 to stage B of register 28B. At that instant, if the request line is still low, the conditions are again satisfied for gate 18B to go low and form another return request pulse. The operation as just described repeats itself and another data strobe pulse 470, FIG. 4, is generated during the second data byte transfer period $T_2$. As shown in FIG. 4, a three byte transfer is involved. Thus the operation as described repeats itself once more to form a third data strobe pulse 490.

After data strobe 490 is completed, all three data bytes have been transferred. As shown in FIG. 4, the request line may be turned off at a time when the third ready signal 465 is first formed. Nevertheless, interface circuit B continues to form and complete the data strobe pulse 490. Completion of data strobe 490 when the request line is high, places the logic circuit of interface B into an initial condition.

It should be noted that once the vector of A = 1, B = 1, and C = 0 is formed in shift register 28B, a data strobe pulse 450 is initiated and it will be completed even if ready signal 435 were to suddenly go high due to a noise transient. This event occurs because register 28B shifts right whether ready signal 435 is high or low. Thus, in either event, the 1 will be shifted into stage C in order to terminate the data strobe irrespective of the input status of the mode control signal from gate 26B to register 28B.

Table No. 1 presents several possible input conditions and shows the circuit operation as just described for either register 28A or register 28B. It would unduly extend the description of this invention to furnish all possible input conditions in Table No. 1. Suffice it to say that the interface logic circuits properly initiate and complete a data strobe for all possible input conditions. The presence of noise spikes of either polarity less than two clock pulses in duration do not complete the shifts necessary for initiation of a data strobe. Table 1 is self-explanatory in that regard and thus need not be described in any more detail.

TABLE 1

| S | A | B | C | S | A | B | C | S | A | B | C |
|---|---|---|---|---|---|---|---|---|---|---|---|
| 0 | 0 | 0 | 0 | 0 | 0 | 0 | 0 | 1 | 1 | 1 | 1 |
| 0 | 0 | 0 | 0 | 0 | 0 | 0 | 0 | 1 | 1 | 1 | 1 |
| 1 | 1 | 0 | 0 | 0 | 0 | 0 | 0 | 1 | 1 | 1 | 1 |
| 1 | 1 | 1 | 0 | 0 | 0 | 0 | 0 | 0* | 1 | 1 | 1 |
| 1 | 1 | 1 | 1 | 1 | 1 | 0 | 0 | 1 | 0* | 1 | 1 |
| 1 | 1 | 1 | 1 | 0 | 0 | 1 | 0 | 1 | 1 | 10* | 1 |
| 0 | 0 | 1 | 1 | 0 | 0 | 0 | 1 | 1 | 1 | 1 | *01 |
| 0 | 0 | 0 | 1 | 0 | 0 | 0 | 0 | 1 | 1 | 1 | 1 |
| 0 | 0 | 0 | 0 | 0 | 0 | 0 | 0 | 1 | 1 | 1 | 1 |
| 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 1 | 1 | 0 | 0 | 1 | 1 | 0 | 0 | 1 | 1 | 0 | 0 |
| 1 | 1 | 1 | 0 | 1 | 1 | 1 | 0 | 1 | 1 | 1 | 0 |
| 0 | 0 | 1 | 1 | 0 | 0 | 1 | 1 | 1 | 1 | 1 | 1 |
| 0 | 0 | 0 | 1 | 1 | 1 | 1 | 1 | 0 | 0 | 1 | 1 |
| 0 | 0 | 0 | 0 | 1 | 1 | 1 | 1 | 1 | 1 | 1 | 1 |
| 0 | 0 | 0 | 0 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 0 | 0 | 1 | 1 | 0 | 0 | 1 | 1 | 0 | 0 | 1 | 1 |
| 0 | 0 | 0 | 1 | 0 | 0 | 0 | 1 | 0 | 0 | 0 | 1 |
| 1 | 1 | 0 | 0 | 1 | 1 | 0 | 0 | 0 | 0 | 0 | 0 |
| 1 | 1 | 1 | 0 | 0 | 1 | 0 | 1 | 1 | 0 | 0 | 0 |

TABLE 1-continued

|   |   |   |   |   |   |   |   | Section A | | |
|---|---|---|---|---|---|---|---|---|---|---|
| S | A | B | C | S | A | B | C | S | A | B | C |
| 1 | 1 | 1 | 1 | 0 | 0 | 0 | 1 | 1 | 1 | 1 | 0 |
| 1 | 1 | 1 | 1 | 0 | 0 | 0 | 0 | 1 | 1 | 1 | 1 |
|   |   |   |   |   |   |   |   | 1 | 1 | 1 | 1 |

At this point, however, a special consideration of one case of Table No. 1 should be discussed. If the input signal is high to shift register 28A or 28B for an extended period as shown at Section A of Table 1, and a single noise spike occurs for a duration of one clock pulse, that noise spike may be viewed as a 0. See, for example, the 0 with an asterisk in Table No. 1. That 0 would be entered into a shift register such as register 28A as for 0 for stage A. If that 0 were allowed to propagate to stage C while a high, or 1, condition is at the mode control input, S, the conditions after shifting would be established to cause generation of a data strobe pulse. Propagation of a 0 stage C while 1's are in stages A and B would result in initiation and subsequent completion of a data strobe at an incorrect time as shown by the dashed block. This condition can, however, not occur because of the presence of vector modification gates discussed earlier. Thus, as shown in Section A of Table 1, when the mode control receives a noise transient and that transient is moved into stage A as a 0, the presence of a 1 in stages B and C coupled with a high or 1 present as the mode control input S satisfies logic gate 54B, FIG. 2 and its output goes low. This causes the input to gate 52B to go low and the output of gate 52B to go high. A high output from gate 52B makes stage B assume a 1 upon occurrence of the clock pulse that would otherwise move the 0 noise transient into stage B. Accordingly, the possibility of a false data strobe is prevented from occurring.

In summary, the interface circuits of this invention avoid ambiguities that might be caused by random noise on the signal lines, and synchronize the transmission interface timing control signals to an internal clock of a recipient device. A control signal is sampled by the internal clock of the recipient device and a signal transition is recognized only upon the second consecutive sample that the control signal remain in its new state. A noise spike of either polarity of a duration less than two clock periods will have no effect on the receiving system whenever such a noise spike may occur.

The operation and time sequence of the various control signals for a data transfer is summarized as follows:
a. An outbound request signal is coupled onto an outbound request line by the transmitting device.
b. The outbound request signal places a signal on an inbound request line which is sampled and synchronized by the recipient device.
c. The synchronized inbound request signal places an outbound response signal on the outbound response line.
d. The signal on the response line, inbound to the transmitting device, is sampled, synchronized and causes the generation of a signal on its outbound ready line.
e. The ready signal, inbound to the recipient device, is sampled, synchronized, and used to form a data strobe pulse.
f. Upon completion of the data strobe pulse, the inbound ready signal is used to turn off the outbound response signal.
g. Turnoff of the outbound response line will in turn cause turnoff of the inbound ready line.
h. Turnoff of the inbound ready line will again cause the outbound response line to turn on, conditional on the request line being on, for receiving of the next byte of data.
i. At the end of a block transmission, the request line is turned off by the transmitting device simultaneously with the ready line, outbound from the transmitting device for the last character being turned on.
j. Release of an inbound request line is recognized only upon the third clock pulse of a recipient device. The reason for this criteria is that the inbound request line is used in an unbuffered non-stored, form in order to enable the outbound response line and consequently also to release the same. The outbound response line must then remain enabled until the data strobe for the last character byte has been completed. Stated differently, turn-off of the outbound response line occurs normally at the trailing edge of the data strobe pulse which is at the end of the third time period of the ready line receiving register. For the last character the release of the outbound response line is caused by either removal of an inbound request signal or the data strobe being completed. Release of the response line by the inbound request line may not precede the release by the completion of the data strobe.

The operation of a signal synchronizing and noise control receiving register for the transmission interface timing control signals, in general, and for the ready line register, in particular, is summarized as follows:
a. A signal change is recognized only if the signal remains in its new state for two consecutive clock periods after the signal has remained in its prior state for two clock periods.
b. A data strobe will be generated only for a unidirectional change of the input signal.
c. Once a data strobe pulse has begun to form, it will be completed independently and the fact that it was completed will be independently reported. Independently, as used here, implies independence of what is happening on the input signal line.
d. A noise spike of either polarity of a duration less than two clock periods occurring at any time will not be the cause of a double data strobe pulse, nor will such a noise spike interrupt the forming of a data strobe pulse nor interrupt the subsequent report signal that a data strobe pulse was formed.

What is claimed is:
1. Apparatus for controlling the transfer of data from a first computer to a second computer, said computers having asynchronous clocks, said apparatus comprising:
first interface means associated with said first computer;
second interface means associated with said second computer;
said first interface means including means responsive to said first computer for transmitting a request to transmit signal to said second interface means;

said second interface means including means for responding with a response signal to said first interface means, only if the request to transmit signal has been received for at least two clock times of said second computer;

said first interface means including means for responding with a ready signal to said second interface means, only if the response signal has been received for at least two clock times of said first computer; and said second interface means including means for responding with a data strobe signal to said second computer, only if the ready signal has been received for at least two clock times of said second computer.

2. Apparatus in accordance with claim 13 further comprising:

said second interface means, including interlock means, responsive to receipt of said request to transmit signal for a duration of at least two clock times of said second computer for inhibiting transmission of a request to transmit signal by said second interface means.

3. The apparatus according to claim 1, wherein said second interface means further includes:

means responsive to the termination of said data strobe signal for terminating the response signal being transmitted to said first interface means.

4. The apparatus of claim 3 wherein said second interface means further includes:

means responsive to the interruption of said response signal for re-enabling the transmission of a request to transmit signal from said second interface means if directed by said second computer.

5. The apparatus according to claim 1, wherein said means for responding with a response signal includes a bidirectional shift register; and means for coupling said request to transmit signal to a mode shift terminal of said bidirectional shift register for controlling the direction of shift, said bidirectional shift register being provided with fixed logic level signals of opposite polarity at opposite input ends thereof.

6. The apparatus according to claim 1, wherein said means for responding with said data strobe signal includes a unidirectional shift register;

means for providing said unidirectional shift register with logic level signals of a first polarity at one input terminal thereof;

means for overriding the state of one of the storage locations in said second bidirectional shift register with a signal of opposite polarity to that of said first polarity;

and means for inhibiting said override means responsive to the presence of said ready signal.

7. The apparatus according to claim, 1 wherein said means for responding with said ready signal includes a unidirectional shift register.

8. An interface logic circuit, comprising:

a serially connected bidirectional shift register having input terminals at either end for entering logic level signals of opposite polarity, a clocking terminal and a mode control terminal for determining the direction of shift of said bidirectional shift register;

means for entering fixed logic level signals of opposite polarities at opposite ends of said bidirectional shift register in response to the character of a request to transmit signal received from a remote location;

means operably connected to one of the storage locations of said bidirectional shift register for generating a response signal responsive to a predetermined state of said one register;

a unidirectional shift register having at least one clocking terminal, a signal input terminal, a plurality of output terminals corresponding to the individual storage locations within said unidirectional shift register, and parallel feed input terminals associated one each with the individual storage locations within said unidirectional shift register;

means for applying a logic level signal of a predetermined polarity to a preselected one of the storage locations in said unidirectional shift register in response to a ready signal received from said remote location; and means for overriding the state of a preselected one of the storage locations in said unidirectional shift register with a logic level signal of a polarity opposite to said predetermined polarity, in the absence of an input signal to said unidirectional shift register.

* * * * *